United States Patent

McDonnell

[15] 3,651,485

[45] Mar. 21, 1972

[54] HOLOGRAPHIC DATA PROCESSING SYSTEM

[72] Inventor: James A. McDonnell, Binghamton, N.Y.

[73] Assignee: International Business Machines Corporation, Armonk, N.Y.

[22] Filed: Oct. 16, 1969

[21] Appl. No.: 866,979

[52] U.S. Cl. ....................340/172.5, 350/3.5

[51] Int. Cl. ....................G06f 9/00

[58] Field of Search ....................340/172.5, 173 LM; 235/157, 350/3.5; 235/152; 353/25

[56] References Cited

UNITED STATES PATENTS

| | | | |
|---|---|---|---|
| 3,440,620 | 4/1969 | French | 340/173 LM |
| 3,479,652 | 11/1969 | Foster | 340/173 |
| 3,488,636 | 1/1970 | Dyck | 340/173 |
| 3,542,448 | 11/1970 | Reynolds et al. | 350/3.5 |

OTHER PUBLICATIONS

" Analog-to-Digital Converter" by K. S. Pennington & P. M. Will, IBM Technical Disclosure Bulletin, Vol. 11, No. 7, Dec. 1968.

" Hologram Memory for Storing Digital Data" by V. A. Vitols, IBM Technical Disclosure Bulletin, Vol. 8, No. 11, April 1966.

*Primary Examiner*—Gareth D. Shaw

*Attorney*—Hanifin and Jancin and Andrew Taras

[57] ABSTRACT

Large scale integration techniques are combined with holographic techniques to provide a highly compact data processing system of extreme high speeds of operation. A single integrated circuit control module containing light responsive devices is selectively actuated by different patterns of light beams generated by appropriate holograms each selected from a single holoarray to provide all of the arithmetic and logic functions of a data processing system.

9 Claims, 18 Drawing Figures

INVENTOR
JAMES A. McDONNELL

BY [signature]
AGENT

CONTROL MODULE

RESET (0-0)

START (0-1)

ADDRESS STORAGE (0-2

ADD "1" TO STORAGE ADDRESS (0-3)

READ IN LOW ORDER ADDRESS BITS AND INSERT FIRST MICRO OPERATION ADDRESS OF INSTRUCTION. (0-4).

ADD "A" TO "B" (FIRST ADD)

STORE ALU OUTPUT IN STORAGE
END INSTRUCTION

HOLOGRAPHIC DATA PROCESSING SYSTEM

BACKGROUND OF THE INVENTION

The desirability of reliable and compact apparatus of high volumetric efficiency has been recognized for some time. The advent of improved techniques in large scale integration techniques has fostered development limited to subsystems of a computer, for example, memories of various types.

The present invention accordingly takes advantage of large scale integration techniques and advances in holographic techniques to provide a data processor of small size, of extremely high speeds, at a cost below present day computing systems.

OBJECTS

The primary object is to provide a small, compact data processor of high component densities using large scale integration techniques, capable of performing all the logic and arithmetical functions under control of holographic techniques.

Another object is to provide a high speed data processor in which the controllable elements are constituted of light responsive devices forming a part of integrated structures comprised of a single module and activatable under control of holographic techniques.

The foregoing and other objects, features and advantages of the invention will be apparent from the following more particular description of a preferred embodiment of the invention, as illustrated in the accompanying drawings.

Figure 1:
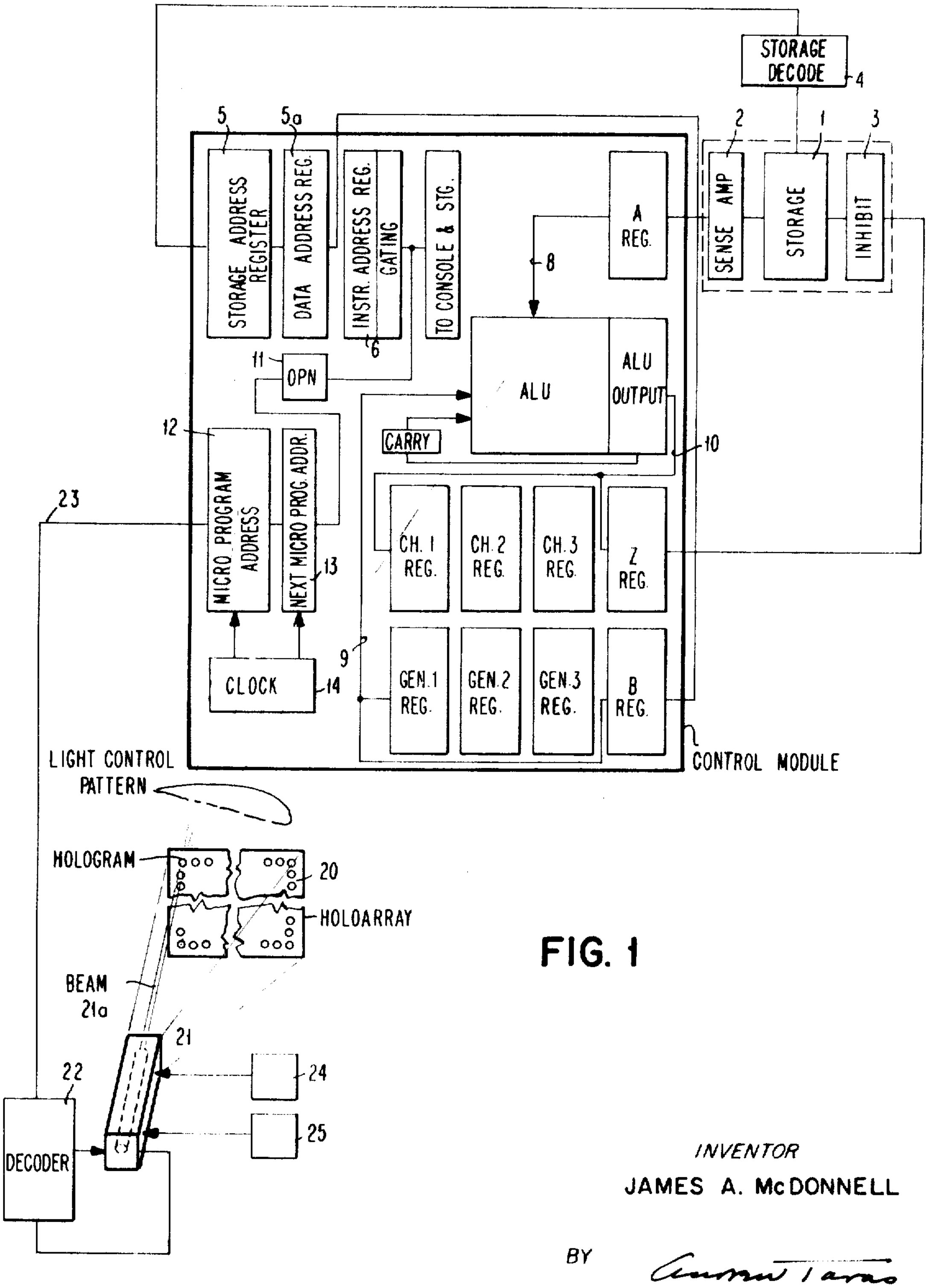
FIG. 1 shows an overall schematic arrangement of the data processing system comprising the invention.
Figure 2:
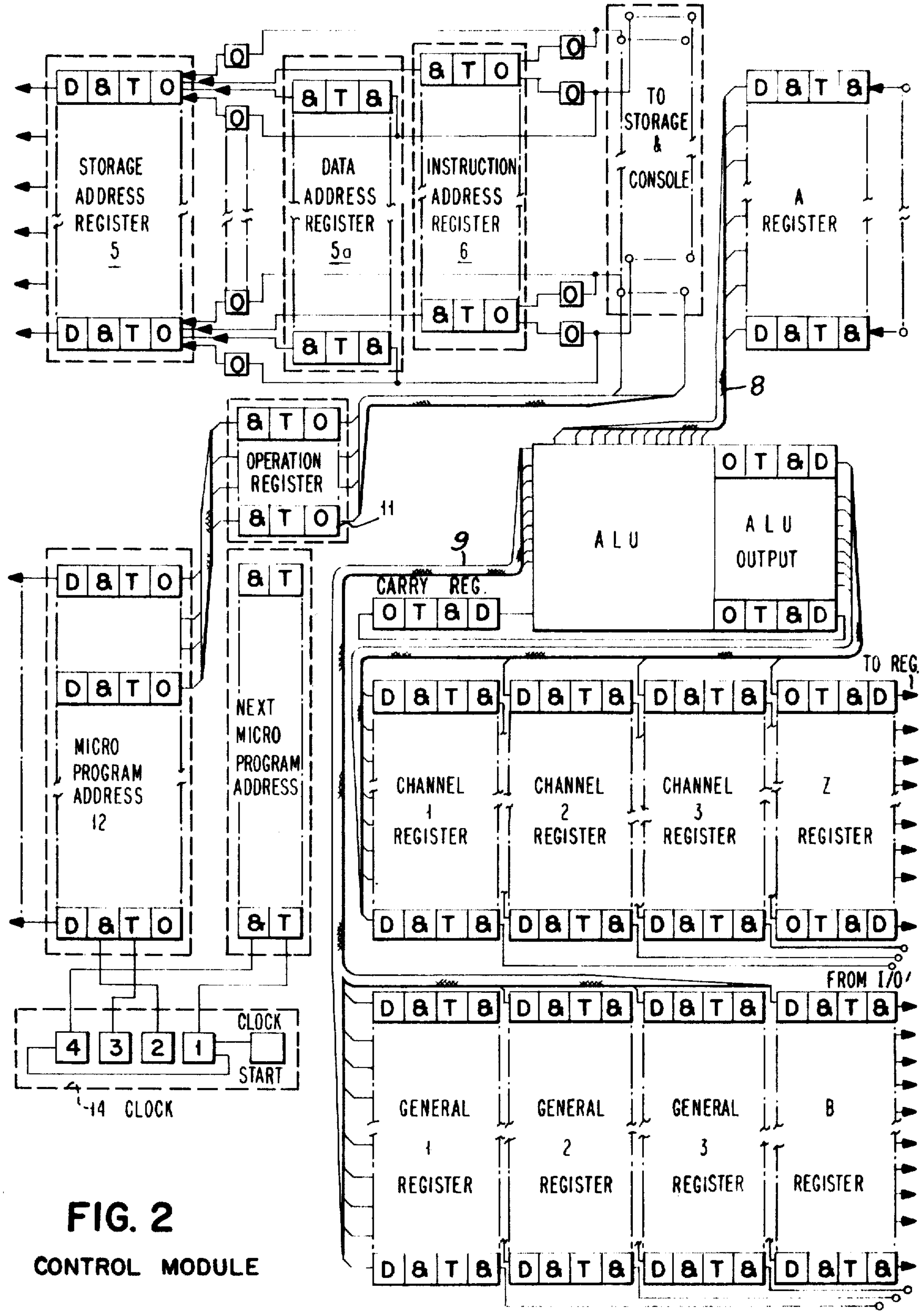
FIG. 2 is a detailed drawing of a control module containing controllable circuits and light responsive devices responsive to light patterns for enabling the controllable circuits.

A schematic arrangement of a conventional digital computer incorporating program control by means of holographic patterns is shown in FIG. 1. The computer arrangement is somewhat of the type commercially known as an IBM *360* System shown and described in U.S. Pat. No. 3,400,371 issued to G. M. Amdahl et al. and assigned to the common assignee. This arrangement is comprised of instrumentalities such as storage means, registers, arithmetic and logic means (ALU) and interconnecting cables, all of which are in FIGS. 2 and 4 of said patent. The arrangement comprises a storage 1 having associated therewith sense amplifiers 2, inhibit means 3, decoding means 4, storage addressing registers 5 and 5*a*, an instruction address register 6, and a control console (not shown), all interconnected in the manner shown to effect the transmission of data and address information into and out of the storage 1, this being effected in a manner well known in the art. The computer arrangement further includes an arithmetic and logic unit ALU interconnecting data registers A, B and Z by means of data flow path lines 8, 9 and 10 respectively. All of the arithmetic and logic functions of the ALU are initiated under control of an OP code register 11 and the course of a selected operation is monitored by a microprogram address register 12 and a next microprogram register 13. Synchronization of all activities of the computer is controlled by clock 14. In this arrangement, program control and operation sequencing for a selected operation code are enabled by controlling impedances in selected ones of the various logic circuits by means of unique patterns of light radiation. (A layout of the circuits which are thus enabled is shown in FIG. 2.)

The different light patterns are generated from the holograms constituting the holoarray 20 which for illustrative purposes is a 64×64 array providing 4,096 different light patterns each unique to enable selected ones of the logic circuits in the module to be actuated to perform a desired microstep of which a predefined number of such steps (or microprograms) are utilized in the performance of a desired operation code specified by an instruction residing in the operation register 11 of the computer. Each microprogram is selected by a unique orientation of a coherent light beam 21*a* issuing from a scan laser 21 controlled by a decoder 22 connected by way of line 23, to the microprogram address register 12. Each address issued by the latter register is fed into the decoder 22 which converts the address data to analog signals that are utilized to control the scan laser to issue a unique spatial orientation for the beam 21*a*. Thus each hologram in the holoarray is illuminated by a unique orientation of the beam 21*a* to cause the selected illuminated hologram to issue its unique pattern of light rays that impinge upon appropriate enabling means forming a part of the logic circuits in the module.

Each hologram so selected provides a unique control which may be defined as a "control word" to perform a specific microprogram step.

In the general operation of the computer, as set forth in the aforementioned patent, a sequence of instructions and data to be processed are entered into storage 1 in conventional fashion. From the console (not shown) the address of the first instruction is entered into the storage address register 5, causing the first instruction to enter the operation register 11 and the data address register 5*a*. The address in the data address register 5*a* selects the first data byte which is transferred to the A register of the data flow. The operation code in the operation register 11 is transmitted to the microprogram operation register 12 and is translated into appropriate analog signals which cause a hologram pattern to be imaged on the data flow plane to enable the performance of a specific function. As part of the pattern of the control word, the address of the next hologram is given. This next hologram in turn contains the address of the succeeding hologram, in this manner a chaining or sequencing of control words is developed to accomplish the operation specified by the instruction. The last hologram in an operation sequence addresses the instruction address register 6 in the system which, by suitable means, advances the address to select the next instruction from storage. The operation is terminated by a stop address in an appropriate instruction.

The control module shown in FIG. 2 contains the ALU which includes appropriate facilities and instrumentalities to perform all arithmetic and logic functions of the computer. Inputs of the ALU are connected via data flow lines 8 and 9 to the A and B registers, in turn connected to the storage sense amplifiers. General purpose registers GR1, GR2, GR3 for storing constants are connected between the B register and the data flow lines 9. Outputs from storage 1 (see FIG. 1), issued by way of the sense amplifiers pass to the registers A and B. Instructions from the storage 1 are gated to the operation register 11 and the data address register 5*a*. The Z register communicates with storage 1 by way of the inhibit means and is connected by way lines 10 to an adder output register 15, and input/output channel registers CH1, CH2 and CH3.

Figure 3:
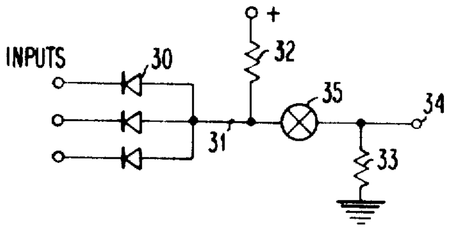
FIGS. 3, 3*a*, 4, 4*a*, 5, 5*a*, 6, 6*a*, show detailed circuit configurations for AND, OR, Drive and Trigger circuits respectively.
Figure 3A:
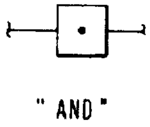

A detailed inspection of the control module shows that each of the logic circuits includes four different types of circuit configurations referenced as &, O, D and T to signify respectively AND, OR, Driver and Trigger circuit configurations. The configurations of these four circuits are illustrated respectively in FIGS. 3–6. The And configuration in FIG. 3, for example, is a conventional And circuit well known in the art, comprising parallelly arranged diodes 30 connected to input terminals 30*a* and to a path 31, in turn connected to a plus voltage by way of resistor 32 and to a ground terminal by way of resistor 33, the path 31 terminating at an output terminal 34. Interposed in the path 31 is a light responsive device 35 which, in the absence of impinging light, imposes a high impedance in the circuit path. Under this condition, and assuming that signal inputs are present on the input terminals 30*a*, a no-signal condition appears at the output terminal 34. On the other hand, the presence of light on the device 35 imposes a low impedance condition in the circuit that results in the issuance of an output at the output terminal 34, providing all data signal inputs are present on the input terminals 30*a*. By virtue of this arrangement, the And circuit is enabled by the presence of impinging light upon the light responsive means 34, and in this manner the light responsive device 34 in combination with the control imposed by the impinging light provides an enabling control for each control point in the module of FIG. 2.

Figure 4:
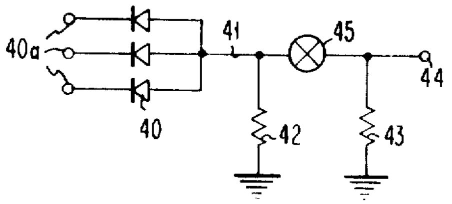
Figure 4A:
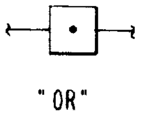

The OR configuration in FIG. 4 is controlled in the same manner as the And circuit described. The OR configuration, also a conventional device well known in the art, comprises parallelly arranged diodes 40 having input terminals 40*a*. The diodes are connected to a common path 41 terminating at an output terminal 44. The circuit path further has connections to ground by way of resistors 42 and 43. Interposed in the circuit path 41 is a light responsive device 45 for enabling operations of the circuit. The device 45, when exposed to light, lowers the impedance of the circuit path, but raises the impedance of the circuit path when the light is removed. Thus when any one or all inputs 40*a* are energized by the presence of appropriate data signals, the output terminal 44 provides an appropriate output signal only when the circuit is enabled by the device 45 when the latter is subjected to impinging light. On the other hand, no signal is issued by the output when the impinging light is removed from the device 45.

Figure 5:
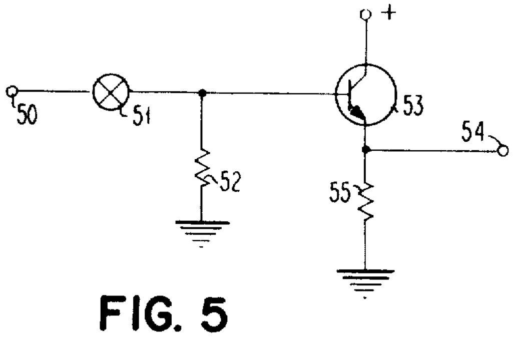
Figure 5A:
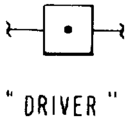

The Driver configuration, shown in FIG. 5, comprises input and output terminals 50 and 54 respectively, between which is a path interconnecting a light responsive device 51 and transistor 53 connected to ground by way of resistors 52, 55. A positive voltage source is connected to the collector of the transistor 53. When a data signal is applied to the input terminal 50, an appropriate output signal appears at the output terminal 54 only when light impinges on the light responsive device 51.

Figure 6:
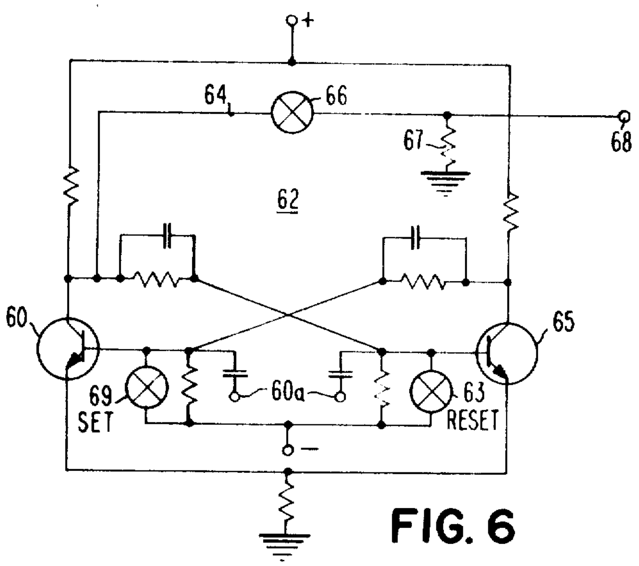
Figure 6A:
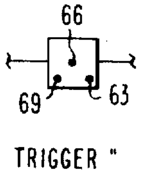

A Trigger configuration in FIG. 6 comprises essentially a pair of transistors 60, 65 interconnected in a circuit configuration 62 which further contains, among other things, light responsive reset and set devices 63 and 69 respectively which, when subjected to light, reset or set the trigger circuit to an initial state. The configuration 62 is connected to a circuit path 64 connected to an output terminal 68, and to ground by way of resistor 67. An enabling control light responsive device 66 is interposed in the path 64. To prepare the trigger circuit for operation, the reset enabling device 63 is activated by light to set the trigger to its initial state, after which input signals are applied at input terminal 60*a* to set the trigger to a desired state providing, however, that the enabling light responsive device 66 is activated by light; otherwise, the trigger is unable to apply output signals.

From a further inspection of the control module, FIG. 2, it is seen that the various circuit configurations shown in FIGS. 3–6 are combined in specific ways to provide different arrangements with each arrangement being enabled by one or more of the controlling devices contained therein. One combination of these controlling devices utilizes a Driver, And, Trigger, Or arrangement shown in the microprogram address register 12, the storage address register 5, the ALU output register, and the Z registers. A second specific combination employing AND, Trigger and OR devices, is utilized in the instruction address register 6, and the operation register 11. A third specific combination utilizing an And and Trigger is employed in the next microprogram operation address register 12. A fourth combination, And, Trigger, And and Driver devices, is used in the A and B registers, channel registers CH1, CH2 and CH3, and general registers GR1, GR2 and GR3. A fifth combination And, Trigger and And is utilized in the data address register 5*a*.

Figure 7:
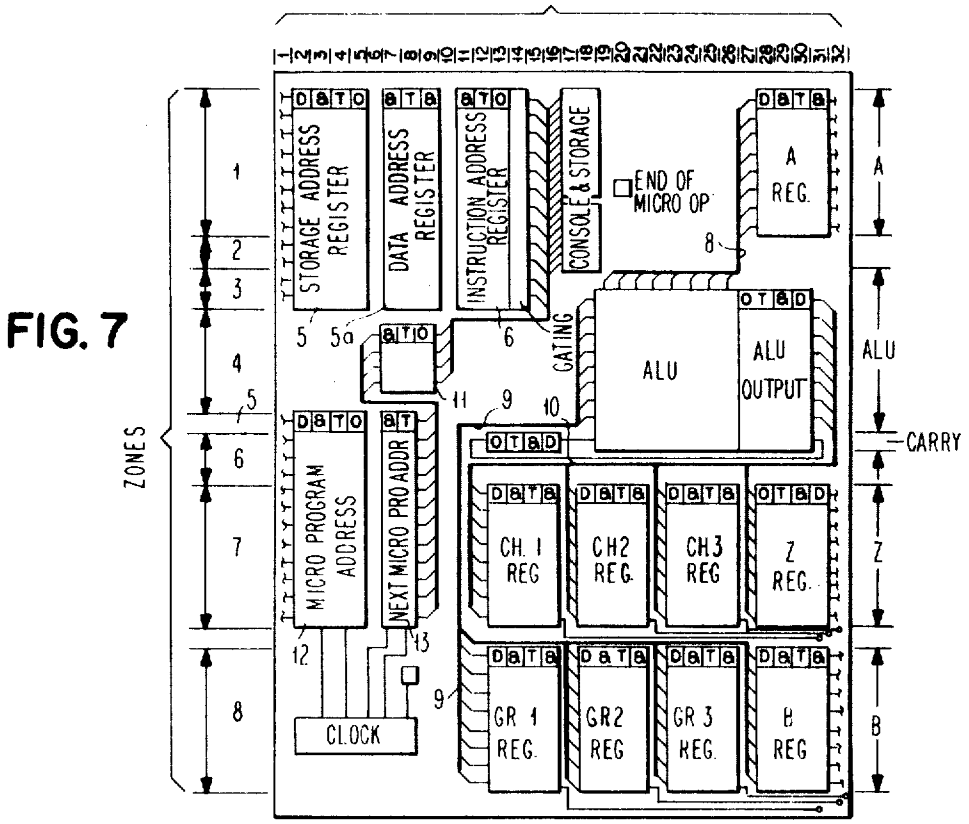
FIG. 7 is a layout plan showing columnar and zone locations of the various controllable devices in the control module of FIG. 2.

The layout in FIG. 7 shows how the various components in the control module are oriented with respect to a columnar-zone coordinate arrangement in order to facilitate the overlay of the various control word patterns, as represented by FIGS. 8–14, bearing corresponding appropriate coordinate identification. By virtue of this arrangement, it becomes fairly evident what components in the module are affected by what designated light patterns.

To illustrate the operation of the invention, an add instruction will be processed by a sequence of microprograms of which the initial microprograms are utilized as preparatory steps followed by microprogram steps designed for execution of the add operation.

Figure 8:
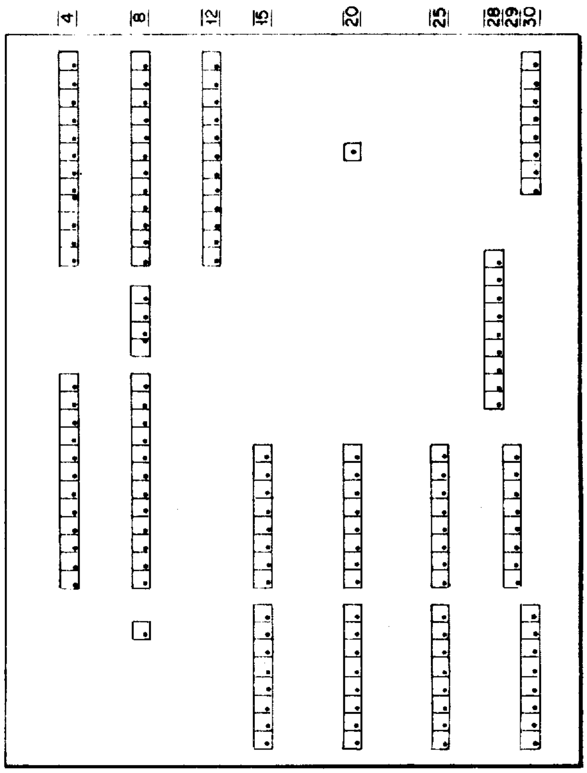
FIGS. 8–14 show different light patterns, each constituting a control word, that impinge on the control module of FIG. 2 to perform an add instruction.
Figure 9:
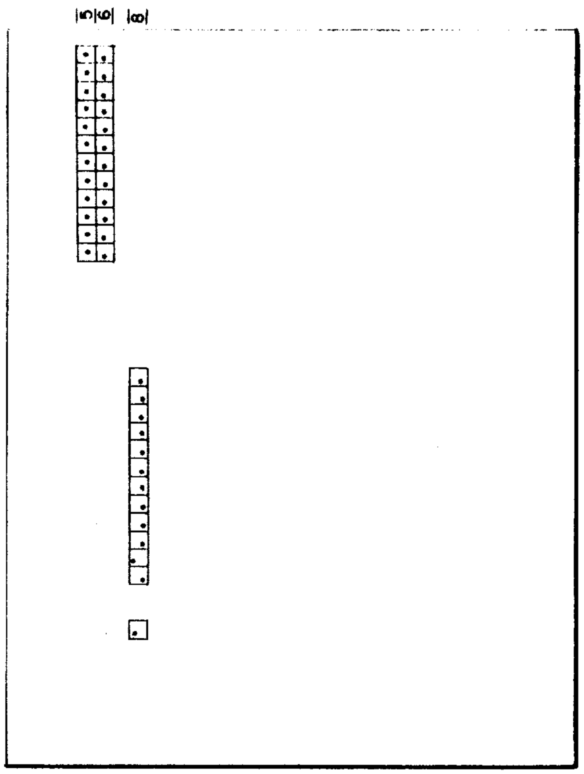

The system is prepared for operation by a reset step which entails resetting all the triggers in the data flow module by directing light at all trigger reset light responsive devices. The control pattern to accomplish the reset function is shown in FIG. 8; when this control pattern is projected on the control module of FIG. 2, a spot of light impinges on each appropriate trigger reset device. The hologram which stores this reset pattern is located in row zero, column zero of the holoarray. The reset means 24 energizes appropriate means in the scan laser that directs a coherent laser beam at the reset hologram in the holoarray position zero-zero from which the reset pattern is imaged on the control module.

Figure 10:
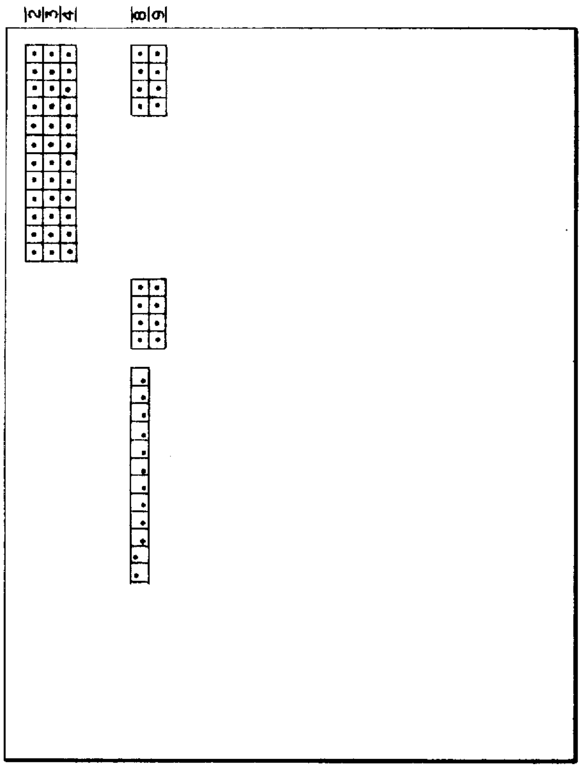
Figure 11:
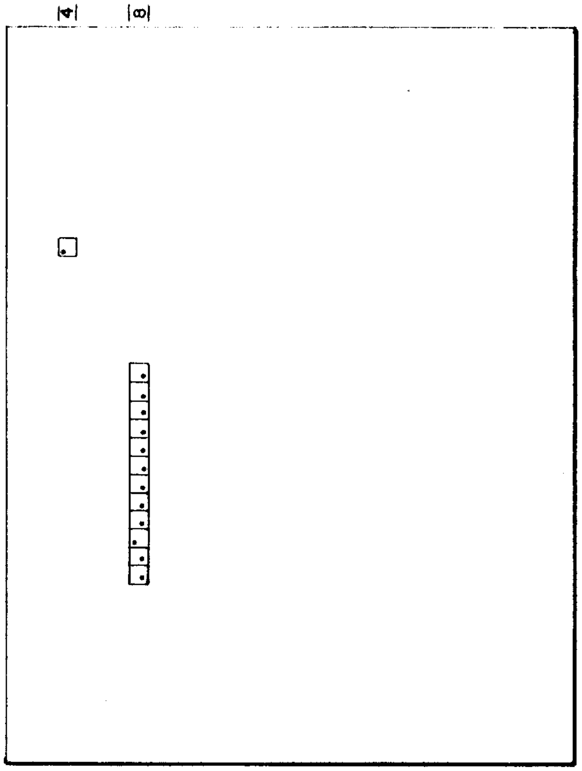

The next step in operation of this system is to depress the start button 25. The start button selects appropriate means in the scan laser to cause the beam to pass through hologram in location zero-one which images the pattern shown in FIG. 9 on the control module. This pattern energizes Trigger enable and And enable devices associated with the transfer of the address from the console 7 to the storage address register 5. This hologram also contains the address of the next microprogram operation and this is imaged on the set trigger light responsive devices associated with the next microprogram address register 13. The next microprogram address zero-two selects the hologram whose pattern is shown in FIG. 10. The zero-two pattern enables the And circuits in the storage address register 5 and thus addresses the storage to deliver the first byte of a machine language instruction, the high order four bits of which are directed into the operation register 11 and the low order four bits are directed into the high order positions of the data address register 50.

Figure 12:
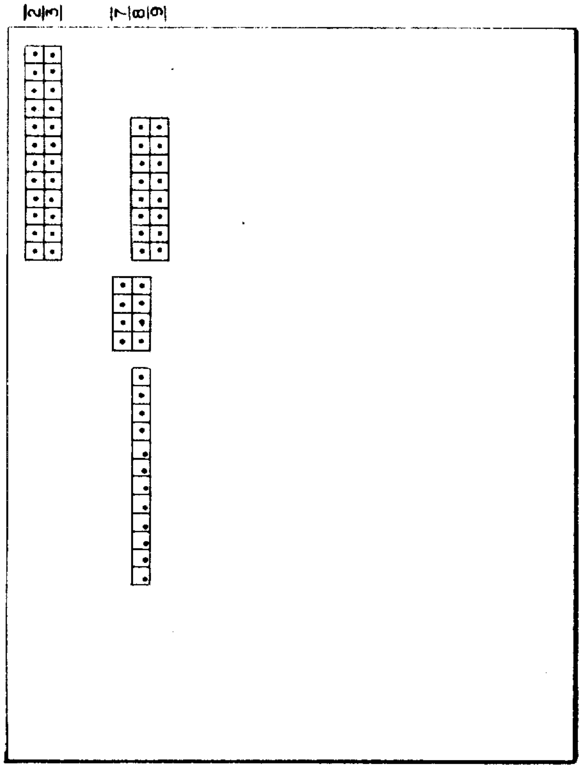

The zero-two pattern also contains the next microprogram address and this is directed to the set trigger devices in the next microprogram address register 13. The address zero-three selects the hologram containing the pattern shown in FIG. 11, which pattern directs light to the set trigger device in the low order position of the storage address register 5. This changes the storage address from zero to one and prepares the system to obtain the second byte of the instruction from storage 1. In a similar manner hologram zero-four, the pattern for which is shown in FIG. 12, is selected by hologram zero-three and directs the next byte from storage 1 into the low order position of the data address register 5*a*. With the first instruction in the control module, the next step is to execute the instruction. The initial sequence of microprograms is finished and the next microprogram depends on which of the machine language instructions is in the operation register 11. The content of the operation register is transferred by hologram zero-four to the next microprogram address register 13. From here the contents are transferred to the microprogram address register 12 and decoded, the first hologram of the machine language instruction is thereby selected to initiate the add operation.

With the first microprogram address of the machine language introduced into the system, subsequent microprogram addresses are obtained, each from the previous pattern in the manner described.

Associated with the microprogram sequencing is the system clock. The system clock is an oscillator which drives a ring of four which in turn controls the microprogram addressing. The system clock is turned on and off by the clock trigger.

The microprogram sequencing circuitry is comprised of the microprogram address register 12 and the next microprogram address register 13. This arrangement enables access to the next microprogram address while the present microprogram is active. In the operation of the clock, ring position one resets the next microprogram address register 13. Ring position two gates the microprogram address register 12 into the decode circuitry 22, which in turn energizes the appropriate means in the laser 21 to select a particular hologram. Ring position three resets the microprogram address register 12. Ring position four transfers the address in the next microprogram address register 13 to the microprogram address register 12.

The foregoing explained the microprograms for entering the add instruction into the data flow, the following describes the microprograms for executing the add operation specified by the operation code in the instruction.

Before attempting an explanation of the microprograms involved with the execution of the add operation, it may be well to introduce some of the characteristics of the system as well as an explanation of the various functions of the microprograms and their bit structures.

The components of the control module are interconnected by data buses which are one byte wide, comprised of eight bits in parallel using binary notation. The machine language instruction is two bytes in length, the high order four bits designate the operation to be performed, and the low order 12 bits are utilized to address 4,096 storage locations.

The four bits assigned to the operation code permit sixteen operations, as charted below.

| Operation | Bits | Function |
|---|---|---|
| 0 | 0000 | move contents of address to register A |
| 1 | 0001 | move contents of address to register B |
| 2 | 0010 | add A to B and store result in storage at address specified by the instruction |
| 3 | 0011 | subtract A from B and store result in storage, etc. |
| 4 | 0100 | store channel 1 register in address in storage, etc. |
| 5 | 0101 | move contents of storage address to channel 1 register |
| 6 | 0110 | store contents channel 2 register in storage address, etc. |
| 7 | 0111 | move channel 2 |
| 8 | 1000 | store channel 3 register in storage address, etc. |
| 9 | 1001 | move channel 3 |
| 10 | 1010 | branch on zero to storage address, etc. |
| 11 | 1011 | test channel 1 register |
| 12 | 1100 | test channel 2 register |
| 13 | 1101 | test channel 3 register |
| 14 | 1110 | move contents of register B to GR register specified in storage address, etc. |
| 15 | 1111 | move contents of register GR specified in address to register B |

Activities of the control module consist of operation sequencing, microprogram sequencing, arithmetic-logic and input/output control.

The instruction sequencing is accomplished by the 12 bit instruction address register 6, an "add two" circuit associated with the instruction address register, the four bit operation register 11, the twelve bit storage address register 5, an end of microprogram sense circuit and a twelve bit input from the console (not shown), all under the control of the microprogramming sequencing.

To initiate a sequence of instructions, the storage address of the first instruction is entered into console switches 12 binary on-off switches). After resetting the machine, the start operation transfers the address in the console switches both to the storage address register 5 and the instruction address register 6. Of the eight bits obtained from the storage address, the high order four bits of the byte are directed to the operation register 11 and the low order four bits are directed to the four high order bit positions of the data address register 5*a*. Since instruction addresses must start with a binary zero, to address the second byte of this first instruction it is necessary only to change the low order bit of the storage address register 5 from binary zero to binary one. This is accomplished by a light pulse directed at the set trigger photo device associated with this position of the storage address register. This second byte of the instruction is directed to the low order eight bits of the data address register 5*a*. The storage address in the data address register 5*a* is now transferred to the storage address register 5 and the system is prepared to execute the first instruction obtained from storage. The instruction address transferred from the console switches to the instruction register 6 is incremented by the plus two circuit and contains the address of the next instruction.

The previous hologram, as shown in FIG. 12, delivers the first microprogram address to the next microprogram address register 13 from the operation register 11, the clock ring transfers the address to the microprogram register and execution of the operation now follows. For purposes of illustration, it is to be assumed that the operation to be performed is "add A to B and store result in storage address specified in instruction;" it will further be assumed that one byte fields are to be added and that the data in register B is a constant already entered.

Figure 13:
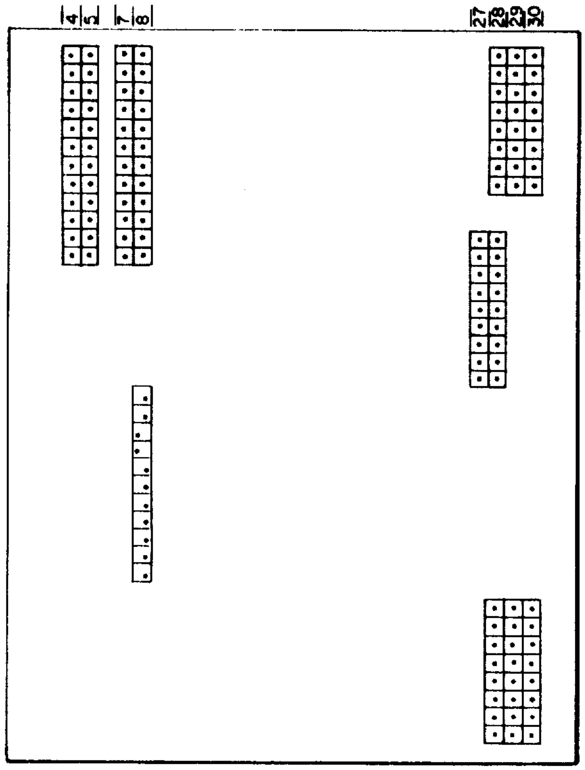

The address of the first microprogram, FIG. 13, has been entered into the microprogram register which yields appropriate signals to the scan laser decoder. This microprogram pattern enables the AND circuits on the outputs of the A register and the B register which permits the contents of these registers to enter the ALU. Further, the ALU output register triggers are enabled to permit the added result to enter. This same microprogram pattern sends a next microprogram address to the next microprogram address register 13.

Figure 14:
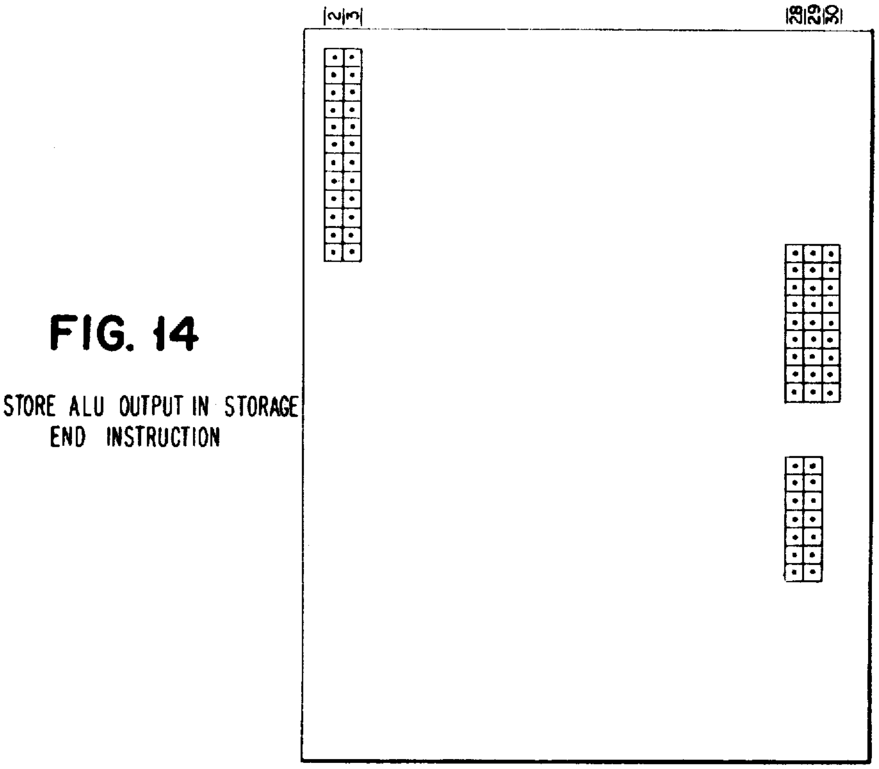

This next microprogram pattern, FIG. 14, enables the storage address register contents to be directed to the storage decode to select a storage location for writing and gates the contents of the ALU output register into the Z register from where it will be read into storage. This is the last microprogram in the instruction and hence it will send an end of microprogram signal and a next microprogram address to the data flow. This end of microprogram signal is sensed by a trigger which initiates an add two to the instruction address register. The microprogram address transfers the next instruction address to the storage address register and the instruction sequence cycle repeats itself.

The practical feasibility of this embodiment derives from recent advances in LSI (large scale integration) techniques coupled with laser-holographic techniques. As a matter of illustration, but in no way a limitation, the data flow constituting the control module shown in FIG. 2 may be fabricated in a 6 inch × 6 inch partitioned silicon substrate. This size is more in keeping with requirements dictated by the holographic image resolution capability rather than by limitations imposed by LSI integration packaging techniques. With present-day techniques, a 2 mm. diameter hologram can image spots of 10-mil diameter on 20-mil centers to an accuracy of plus or minus 3 mils. Based on this 20-mil center, a square inch containing 2,500 control points on the 6-inch square data flow module provides 80,000 control points (2,500 × 36 sq. in.), which can be accommodated by an array of 64×64 2 mm. holograms providing 4,096 control word patterns on a 5-inch × 5-inch holoarray.

While the invention has been particularly shown and described with reference to a preferred embodiment thereof, it will be understood by those skilled in the art that various changes in form and details may be made therein.

What is claimed is:

1. In a data processing system having program storage facilities for storing a program and arithmetic, logic and addressing instrumentalities controlled thereby for performing arithmetic and logic functions;

a control module comprising activatable logic circuits interconnecting said instrumentalities, each of said logic circuits including a light responsive device for activating said circuits;

a source generating a coherent beam of light, said source being controllable to provide a plurality of different beam orientations;

a holoarray responsive to said beam for generating light control patterns and directing said patterns to impinge upon the light responsive devices to activate said logic circuits; and decoding means responsive to said addressing instrumentalities for controlling said source to provide said different beam orientations thereby providing the different control patterns necessary to the performance of said arithmetic and logic functions.

2. A system as in claim 1 in which said holoarray is constituted of a plurality of holograms each generating a unique light control pattern in response to a unique orientation of said light beam.

3. A system as in claim 2 in which said logic circuits include circuits to perform specific functions, each circuit having inputs responsive to signals representing data, an output, and the light responsive device being interposed between said inputs and the output, the latter providing an output signal in response to impinging light derived from said light control patterns.

4. A system as in claim 3 in which selected circuits of said logic circuits are adapted to perform And and Or functions.

5. A system as in claim 3 further including bistable circuits conditioned by light responsive devices adapted to perform reset functions in response to an appropriate light control pattern.

6. A system as in claim 3 in which said control module is comprised of a matrix of integrated elements constituting said logic circuits.

7. A system as in claim 6 in which the integrated logic circuits are interconnected to form different registers to accommodate said data and instructions, said registers being oriented in accordance with a coordinate frame of reference specifying columnar and zone locations in said control module.

8. A system as in claim 7 in which said holoarray is disposed in spaced relationship with said control module and the coordinate dimensions of the former are less than the corresponding dimensions of said control module.

9. A system as in claim 8 in which said holograms are so oriented that any designated activatable logic circuit may be influenced by a corresponding light ray in any of the light control patterns generated by said holograms.

* * * * *